(12) United States Patent  
Mazzocato

(10) Patent No.: US 9,126,254 B2  
(45) Date of Patent: Sep. 8, 2015

(54) APPARATUS FOR THE APPLICATION OF SPACER ELEMENTS ONTO PLATES

(75) Inventor: Luca Mazzocato, Montebelluna (IT)

(73) Assignee: NORT S.R.L., Montebelluna (Treviso) (IT)

( * ) Notice: Subject to any disclaimer, the term of this patent is extended or adjusted under 35 U.S.C. 154(b) by 49 days.

(21) Appl. No.: 13/811,810

(22) PCT Filed: Mar. 30, 2011

(86) PCT No.: PCT/IB2011/051355  
§ 371 (c)(1),  
(2), (4) Date: Jan. 23, 2013

(87) PCT Pub. No.: WO2012/010985  
PCT Pub. Date: Jan. 26, 2012

(65) Prior Publication Data  
US 2013/0117982 A1  May 16, 2013

(30) Foreign Application Priority Data  
Jul. 23, 2010  (IT) ............... VR2010A0152

(51) Int. Cl.  
*B21D 35/00* (2006.01)  
*E06B 3/663* (2006.01)  
*B65G 49/06* (2006.01)  
*B65H 35/00* (2006.01)  
*E06B 3/673* (2006.01)

(52) U.S. Cl.  
CPC ............. *B21D 35/00* (2013.01); *B65G 49/069* (2013.01); *B65H 35/0033* (2013.01); *E06B 3/66304* (2013.01); *B65H 2701/177* (2013.01); *E06B 3/67326* (2013.01); *Y10T 29/5116* (2015.01); *Y10T 156/1075* (2015.01); *Y10T 156/1795* (2015.01)

(58) Field of Classification Search  
CPC .............. B65G 49/069; E06B 3/67326; E06B 3/66304  
USPC ........... 156/71, 523, 526, 527, 539, 543, 574, 156/577, 579  
See application file for complete search history.

(56) References Cited

U.S. PATENT DOCUMENTS

| | | | |
|---|---|---|---|
| 3,580,119 A | 5/1971 | Witherington-Perkins | |
| 3,745,086 A * | 7/1973 | Parker | 156/527 |
| 3,837,636 A | 9/1974 | Hegi et al. | |
| 4,102,731 A * | 7/1978 | Hamisch, Jr. | 156/540 |
| 4,344,813 A * | 8/1982 | Holoff et al. | 156/527 |
| 4,961,816 A | 10/1990 | Lisec | |
| 5,014,896 A | 5/1991 | Reitmeier et al. | |
| 5,259,826 A | 11/1993 | Woods | |
| 5,326,421 A * | 7/1994 | Taylor | 156/526 |
| 5,958,175 A | 9/1999 | Elharrar et al. | |

FOREIGN PATENT DOCUMENTS

EP  1236647  9/2002

* cited by examiner

*Primary Examiner* — Mark A Osele  
(74) *Attorney, Agent, or Firm* — Tutunjian & Bitetto, P.C.

(57) ABSTRACT

Apparatus for the application of spacer elements on plates, including means for feeding the spacer elements in the form of a band, at least one member for cutting the band and for applying the spacer elements, formed by the cutting, on a plate.

23 Claims, 7 Drawing Sheets

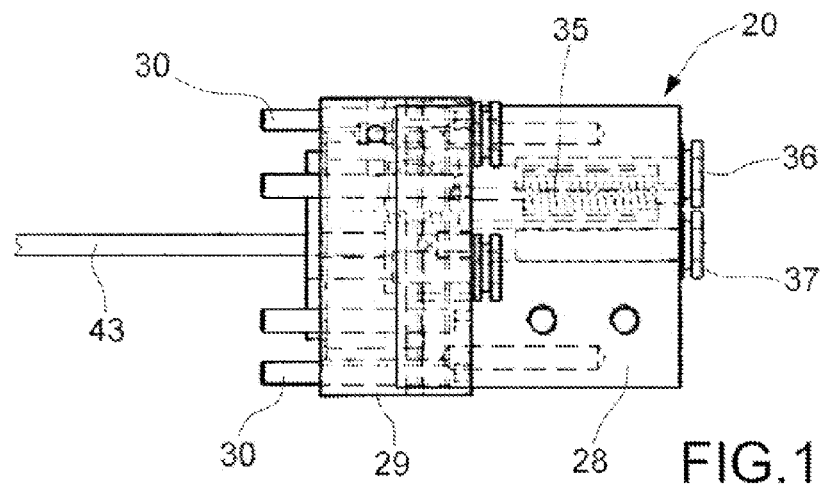
FIG.13
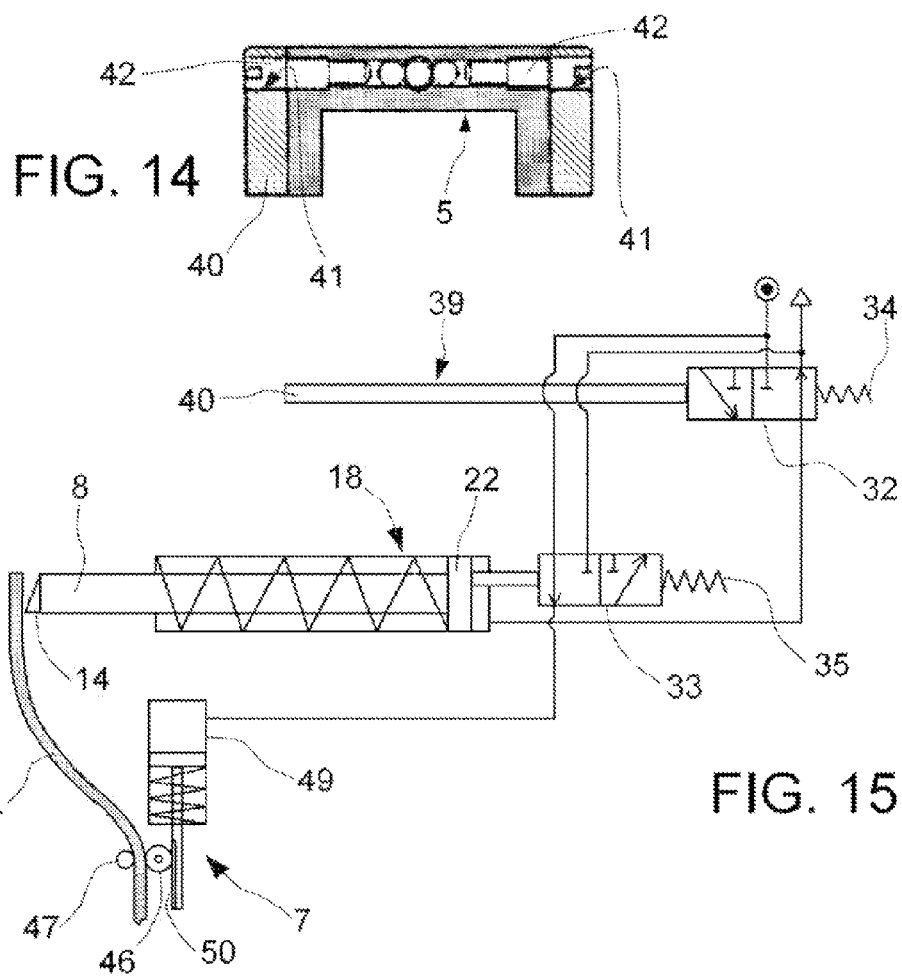
FIG. 14
FIG. 15

APPARATUS FOR THE APPLICATION OF SPACER ELEMENTS ONTO PLATES

TECHNICAL FIELD OF THE INVENTION

The present invention concerns an apparatus for the application of spacer elements onto plates.

More specifically, the present invention concerns an apparatus for the application of spacer elements on plates, to allow them to be stored and/or transported in packs, piles, and the like.

DESCRIPTION OF RELATED ART

Machinery used in the manufacturing of plates, which are intended for the glazing field, are known that, at the end of the production line, take care of applying onto the surface of the plates themselves spacer elements, in a certain number and in certain positions, which vary in relation to the size of the plates themselves.

Such spacer elements, for example made from cork or other materials, generally have the function of protecting the plates, and in particular they prevent the plates themselves, once positioned on top of one another in packs or in piles that are optimal for transportation, from being in direct contact risking braking, damage, scratching, etc.

Moreover, said spacer elements have the function of preventing the plates from sticking to one another, which would then make them difficult to separate.

Moreover, said spacer elements prevent small foreign bodies possibly present between the plates—stones, pieces of metal, other impurities that have accidentally found their way between the plates themselves—from being able to damage them once rested on one another.

Known machinery that applies the spacer elements on the plates is devised and designed to be integrated in production lines for very large batches, which thus have a high automation rate of the operations, including, indeed, that of application of the spacer elements.

Such machinery, therefore, operates mainly close to an automated transportation line of the plates, and is equipped with mechanisms that must work in synchrony with the forward motion of the plates themselves on the transportation line.

The aforementioned machinery, therefore, is provided with many actuators—pneumatic, electric, or of another kind—suitable for carrying out in sequence the various operations necessary to apply the spacer elements onto the surface of the plates.

In particular, in known machinery such operations consist at least of transversally cutting a continuous band—for example of cork—to form the spacer elements, picking them up from the cutting station and precisely positioning them on the surface of the plate.

Carrying out each of these operations clearly requires at least one respective actuator, and all of the actuators must be slaved to a management and control unit of the machine.

The described machinery, therefore, as well as being expensive and bulky, is extremely rigid in its operating modes, since it foresees the presence of a transportation line of the plates, production in vary big batches, and yet other constraints that substantially limit its scope of use.

SUMMARY OF THE INVENTION

The technical task of the present invention is therefore to eliminate the specified problem, by devising an apparatus for the application of spacer elements on plates that is absolutely simple and completely versatile to use.

In such a technical task, a purpose of the present invention is to make an apparatus for the application of spacer elements on plates with simple and cost-effective structure and use, able to be used effectively by operators without any special training.

Yet another purpose of the present invention is to make an apparatus for the application of spacer elements on plates that can also be used in the production of a limited number of pieces, like in the case of small glassworks and other types of industries.

This task and these purposes are accomplished by the apparatus for the application of spacer elements on plates according to the attached claim 1.

The apparatus according to the invention comprises a manual handgrip, means for feeding the spacer elements in band form, and at least one member for cutting the band and for applying the spacer elements, formed by the cutting, on a plate.

According to an advantageous aspect of the present invention, the apparatus is controlled by sequential pneumatic actuation means, which with a simple manual action allow an entire preparation cycle of an element and its application on the plate to be completed.

Further advantageous characteristics are described in the dependent claims.

BRIEF DESCRIPTION OF THE DRAWINGS

The characteristics of the invention will become clearer to any man skilled in the art from the following description and from the attached tables of drawings, given as a non-limiting example, in which:

FIG. 13 is a detailed view from below of the sequential automatic pneumatic actuation means of the apparatus;

FIG. 14 is a section of the apparatus according to the plane XIV-XIV of FIG. 3; and FIG. 15 is a circuit diagram of the pneumatic actuation means of the apparatus according to the invention, in an embodiment thereof.

DETAILED DESCRIPTION OF EMBODIMENTS OF THE INVENTION

Figure 1:
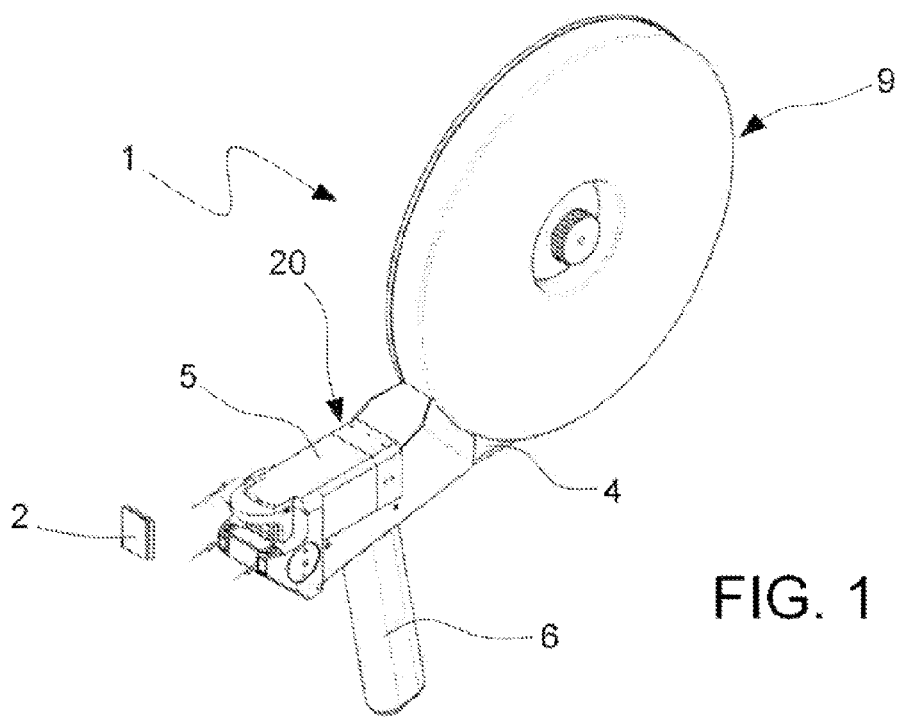
FIG. 1 is a front axonometric view of the apparatus according to the invention.
Figure 2:
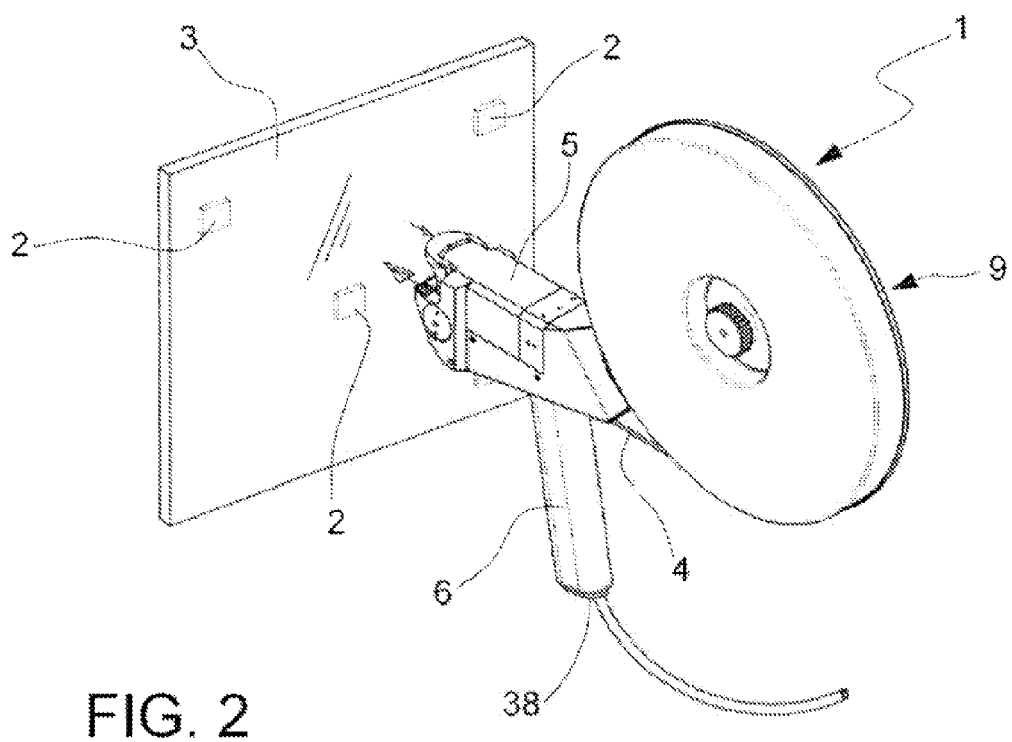
FIG. 2 is a rear axonometric view of the apparatus.

With reference to the attached FIG. 1, an apparatus for the application of spacer elements 2 on plates 3 according to the present invention is wholly indicated with 1.

The apparatus 1 is particularly, but not exclusively, recommended for the application of spacer elements 2 on plates 3 made from various materials, like for example glass, of different sizes and shapes and the surface of which must be kept intact.

The spacer elements 2 are formed from a band 4, for example of cork, or of any other material with equivalent characteristics, for example any yielding material.

The band 4 can have any width.

The band 4, on one of the two faces, possesses a layer of adhesive material, or, more preferably, a layer of material suitable for sticking to the surface of the plate 3 and such as to be able to be removed, easily and with a simple manual gesture, without leaving marks on the plate 3.

The apparatus 1 according to the invention comprises a support frame 5, a manual handgrip 6, means for feeding, wholly indicated with 7, spacer elements 2 in the form of a band 4, and at least one member 8 for cutting the band 4 and for applying the spacer elements 2, formed by the cutting, on a plate 3.

The frame 5 is associated with at least one store for the band 4, wholly indicated with 9, which can be removable and/or interchangeable.

In greater detail, the store 9 comprises two half-shells 10 that enclose within them a reel of band 4, and that also have a protective function from dust and other foreign agents. The half-shells 10 are supported by the frame 5, and are equipped with an opening 11 for the band 4 to pass through towards the means for feeding 7, as can be seen in particular in FIG. 5. The band 4, therefore, comes out from the store 9 and joins directly to the means for feeding 7, as will become clearer hereafter.

Figure 6:
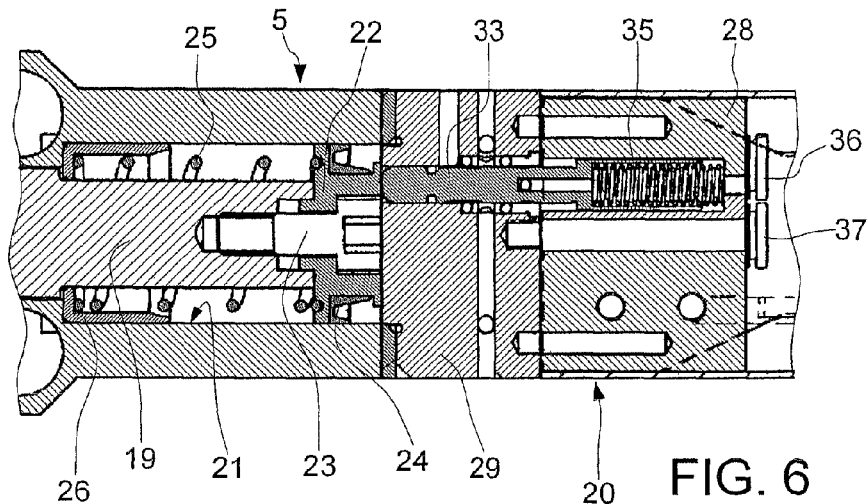
FIG. 6 is a detailed section of the apparatus according to the plane VI-VI of FIG. 3.
Figure 7:
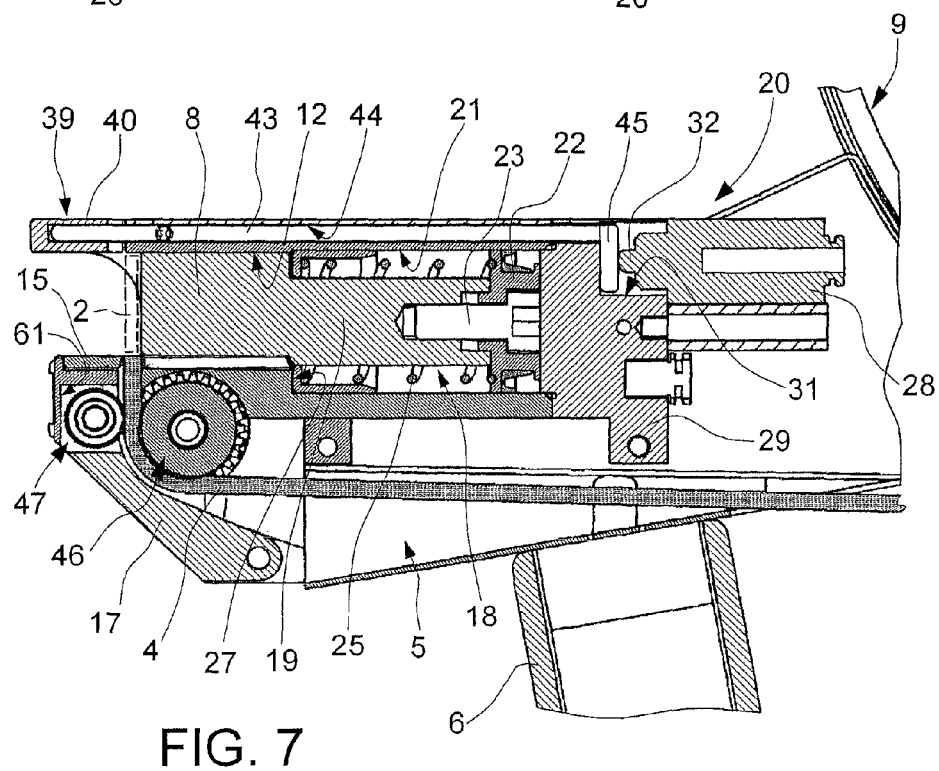
FIG. 7 is a detailed section of the plane VII-VII of FIG. 4.

The cutting and application member 8 of the spacer elements 2, as illustrated in the sections of FIGS. 6,7, is slidably housed inside a respective seat 12, open at the front, foreseen in the frame 5 of the apparatus 1. The seat 12 defines an expulsion mouth 13 of the spacer elements 2, thus positioned in the front portion of the frame 5 of the apparatus 1.

Figure 8:
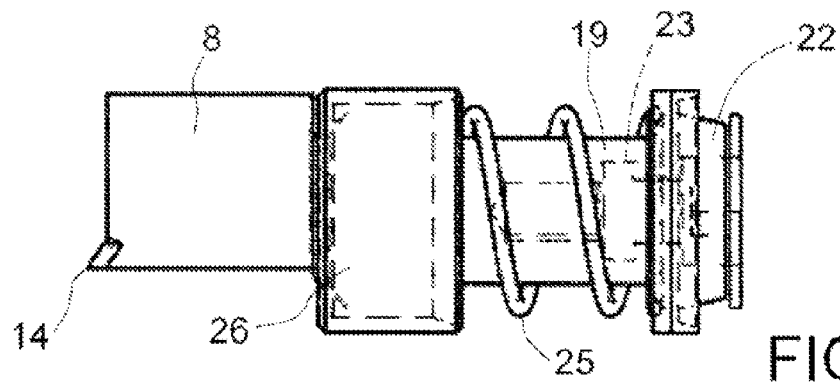
FIG. 8 is a detailed side view of the cutting and application member of the spacer elements on the plates.
Figure 9:
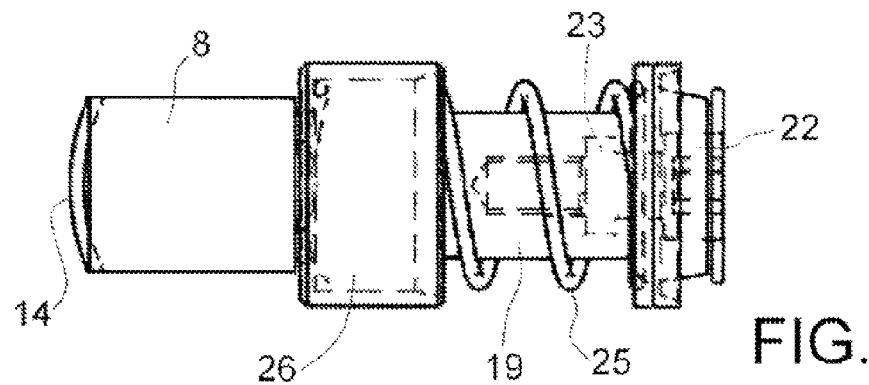
FIG. 9 is a detailed plan view of the cutting and application member of the spacer elements on the plates.

The cutting and application member 8 at the front comprises a transversal blade 14, the profile of which can be approximated as an arc of circumference, as can be seen in FIG. 9. On the other hand, as can be seen in FIG. 8, the blade 14 is foreseen in the lower portion of the front face of the cutting and application member 8.

The apparatus 1 also comprises a transversal counter-blade 15, positioned at the lower edge of the expulsion mouth 13 of the spacer elements 2; the counter-blade 15 cooperates with the blade 14 in carrying out the cutting of the band 4 to isolate each spacer element 2.

In other words, in its translation motion from the inner position to the outer position, the cutting and application member 8, with the blade 14, skims the counter-blade 15, so as to lock and cut a portion of band 4 of equal length to the spacer element 2 to be created, indicated with a broken line in FIG. 7.

In greater detail, the counter-blade 15 is mounted, through an adjustment screw 16, on a tab 17 fixed to the front part of the frame 5 of the apparatus 1.

Figure 5:
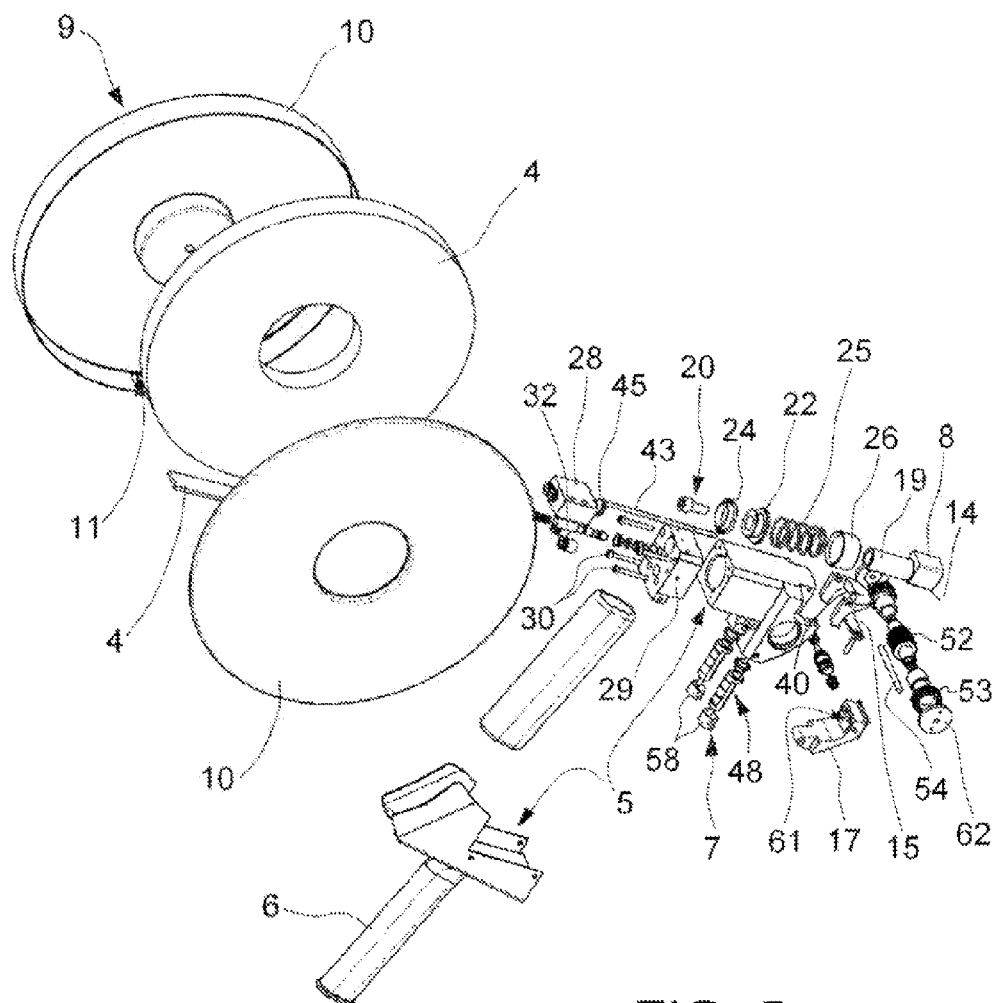
FIG. 5 is an exploded axonometric view of the apparatus according to the invention.

As can be seen in particular in FIGS. 5,6,7, the cutting and application member 8 is fixedly associated with a first pneumatic actuator, wholly indicated with 18, fixed to the frame 5 according to the ways better described hereafter. In greater detail, the cutting and application member 8 is associated with the first stem 19 of the first pneumatic actuator 18: in this way, the cutting and application member 8 is mobile from at least one inactive inner position to at least one outer position for transversally cutting the band 4 and applying the spacer element 2, formed by the cutting, on the surface of the plate 3, as will be made clear hereafter.

The first pneumatic actuator 18 is of the single-acting linear type, and it is operatively slaved to sequential pneumatic actuation means of the apparatus, wholly indicated with 20.

The first pneumatic actuator 18 comprises a first cylinder 21 that is substantially the continuation of the seat 12 of the cutting and application member 8.

The first pneumatic actuator 18 also comprises a first piston 22, fixed to the first stem 19 through an axial screw 23; the first piston 22, which slides in a sealed manner inside the first cylinder 21, is equipped with a first sealing gasket 24 of the lip seal type.

The first pneumatic actuator 18, which as stated is of the single-acting type, comprises a first spring 25, slotted along the first stem 19, which abuts, on one side, onto the first piston 22, and on the other side onto a bushing 26 engaged in abutment in a foreseen shoulder 27 between the first cylinder 21 and the seat 12.

The sequential pneumatic actuation means 20 of the apparatus 1 comprise at least one pneumatic slide valve, of the type per se known in the field of pneumatic automation, comprising in particular a first valve body 28 and a second valve body 29, rigidly joined together.

The second valve body 29, as can be seen in particular in FIGS. 5 and 13, is fixed to the frame 5 through rear screws 30, and rearwardly closes the first cylinder 21 of the first pneumatic actuator 18.

The first valve body 28 is fixed directly to the second valve body 29, and between the two a small chamber 31 is defined at the top, the function of which will be defined better hereafter.

The first valve body 28 and the second valve body 29 respectively comprise a first slide 32 and a second slide 33, the translation of which in one direction or the other allows certain compressed air passageways to be opened and/or closed, as described better hereafter. Such opening and/or closing allow the operating cycle of the apparatus to be managed in a completely automated manner, where by cycle we mean the cutting of a single spacer element 2 and its subsequent application on the plate 3.

The first slide 32 and the second slide 33 are associated, in a known way, respectively with a first return spring 34 and with a second return spring 35.

The sequential pneumatic actuation means 20 preferably comprise a single connection orifice 36 to a pressurised air source, and a discharge orifice 37 foreseen for example in the first valve body 28, so as to reduce the connections and the unions to the minimum.

In greater detail, the connection orifice 36 to a compressed air source, i.e. for example the compressed air plant present at the place where the spacer elements 2 are applied—is placed in communication with a union 38 or quick coupling foreseen in the free end of the handgrip 6.

The apparatus 1 according to the invention comprises an actuation element of the apparatus itself pressing on the surface of the plate 3, said element being wholly indicated with 39.

The actuation element 39 is associated with the sequential pneumatic actuation means 20.

Figure 4:
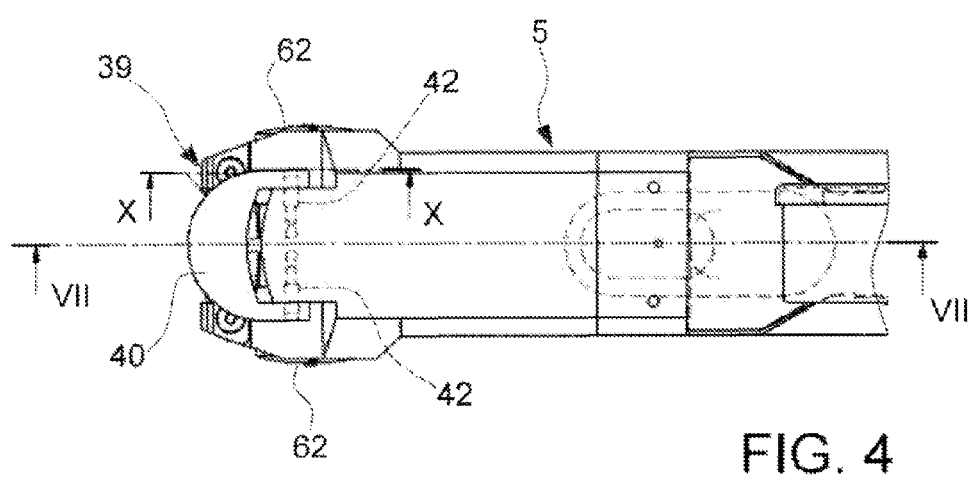
FIG. 4 is a detailed view from above of the apparatus.

Indeed, the actuation element 39 comprises a feeler pin 40, which in plan is substantially semicircular in shape, to allow the actuation also from directions other than perpendicular, as can be seen in FIG. 4.

Figure 3:
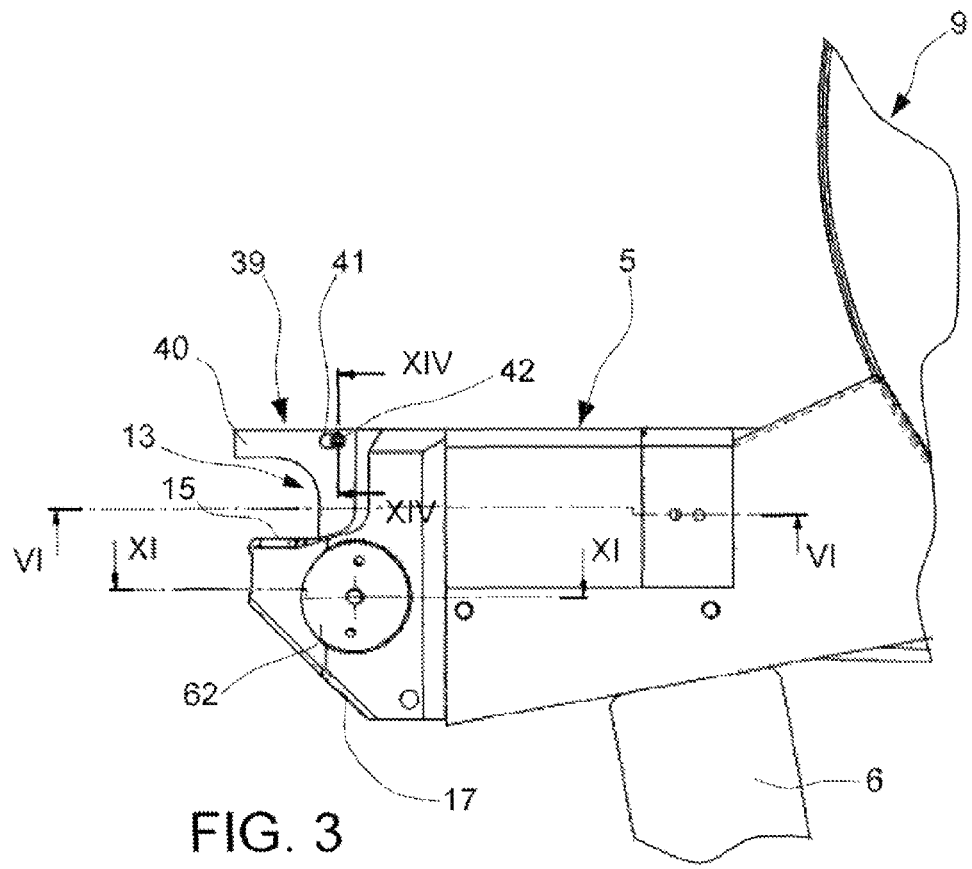
FIG. 3 is a detailed side view of the apparatus.

The feeler pin 40 is slidably associated with the frame 5 of the apparatus 1 at the expulsion mouth 13 of the spacer elements 2. More specifically, the feeler pin 40 is equipped with two slots 41 in which two respective pins 42 are engaged, fixed to the frame 5, as can be seen in FIGS. 3,14.

On the other hand, as can be seen again in FIG. 7, the feeler pin 40 is coupled with a shaft 43 connected to the sequential pneumatic actuation means 20. The shaft 43 is slidably inserted in a respective through housing 44 foreseen in the upper part of the frame 5 of the apparatus 1.

The shaft 43 ends with a disc-shaped portion 45, which is inserted in the chamber 31 and which is in direct contact with the first slide 32 of the first valve body 28.

The means for feeding 7 the band 4 towards the area of the blade 14 and of the counter-blade 15 comprise a controlled roller 46 and an idle counter-roller 47, rotatably supported in the front portion of the apparatus 1 at the expulsion mouth 13 of the spacer elements 2, between which the band 4 passes.

The distance between the side surface of the roller 46 and of the counter-roller 47 is suitably calibrated and, for example, slightly smaller than the nominal thickness of the band 4, so that the pulling of the latter occurs by friction that is created thanks to the slight compression of the band 4 itself.

The aforementioned roller 46 and counter-roller 47 are suitable for pulling the band 4 in front of the expulsion mouth 13 between the blade 14 and the counter-blade 15; the section of band 4 pulled by the means for feeding 7 is the same length as the spacer element 2 that it is intended to make.

The roller 46 is associated with rack means, wholly indicated with 48, controlled by at least one second pneumatic actuator 49.

More specifically, the aforementioned rack means comprise a pair of racks 50 respectively fixedly connected to the second pistons 51 of a pair of second pneumatic actuators 49, as illustrated in FIG. 5.

The second pneumatic actuators 49 are of the single-acting linear type, and are operatively slaved to the sequential pneumatic actuation means 20, as made clear hereafter.

Figure 11:
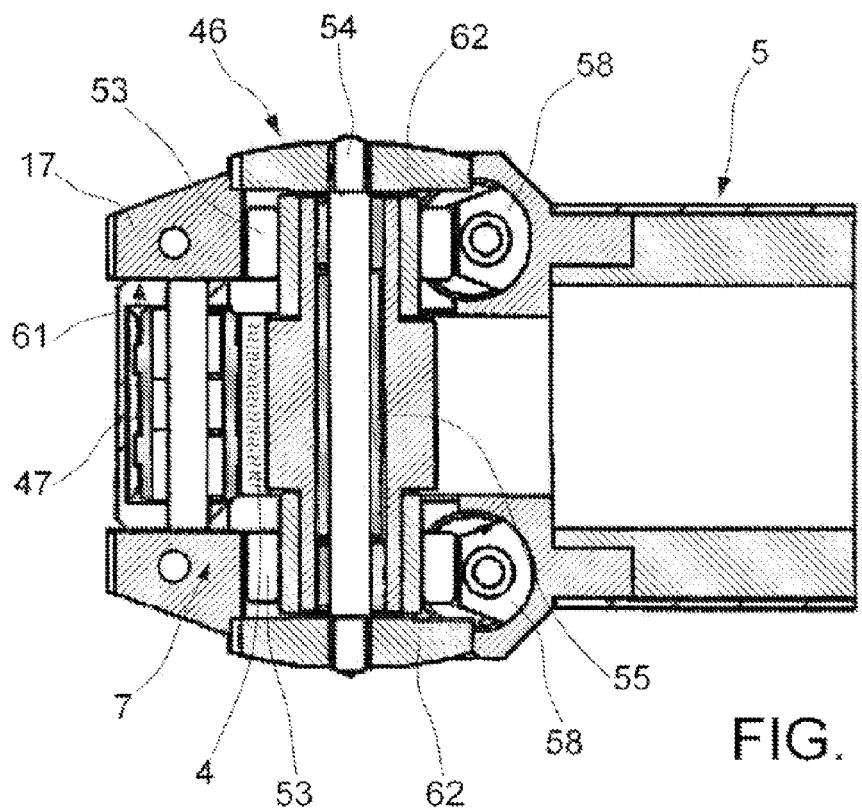
FIG. 11 is a section of the apparatus according to the plane XI-XI of FIG. 3.

The roller 46, mounted on known bearings, comprises a central portion 52, for example knurled, for pulling the band 4, see in particular FIG. 11.

The rack means 48 also comprise two gearwheels 53, fitted onto the roller 46 at the respective opposite ends, which respectively engages with the racks 50.

Figure 12:
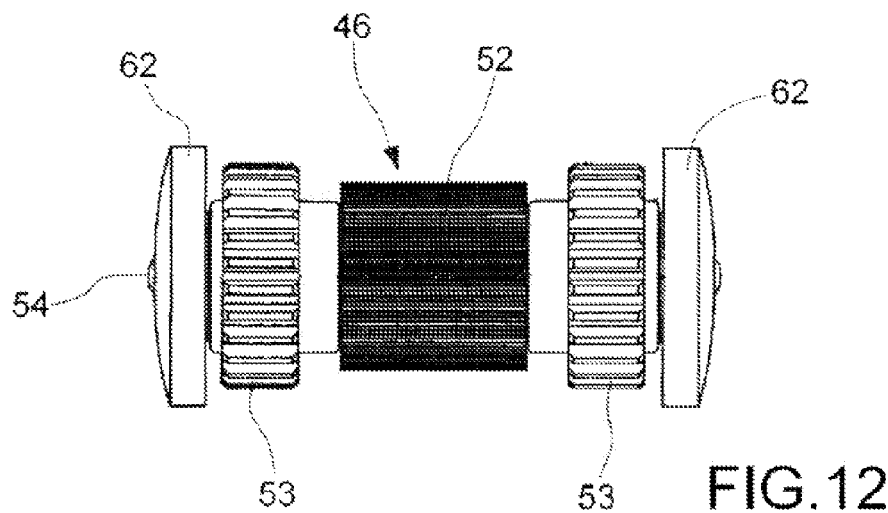
FIG. 12 is a detailed plan view of the means for feeding the spacer elements in band form.

As illustrated in FIG. 12, the roller 46 comprises a central pin 54, on which the gearwheels 53 are fitted at the ends and on which the central portion 52 is also fitted. Between the central portion 52 and the central pin 54 there is a free wheel mechanism 55, or pawl mechanism, or similar, of the known type, which allows the transmission of torque from the gearwheels 53—and thus from the central pin 54—to the central portion 52 knurled only in a direction of rotation.

Figure 10:
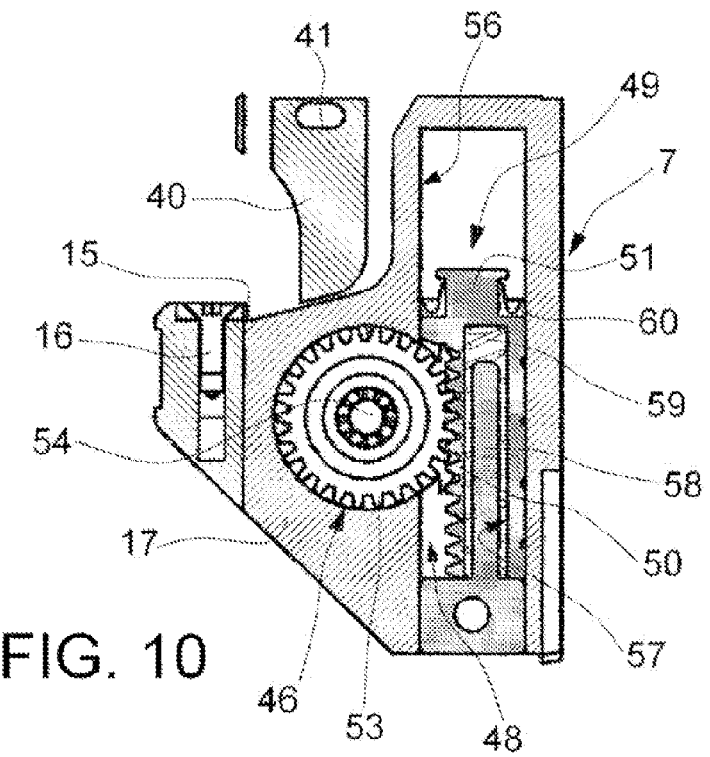
FIG. 10 is a section of the apparatus according to the plane X-X of FIG. 4.

With reference to FIG. 10, each of the second pneumatic actuators 49 comprises a second cylinder 56, formed in the body in the frame 5 and, as stated, a respective second piston 51. Each second piston 51 has an elongated configuration and is provided with an axial cavity 57, in which a respective peg 58 engages at the mouth of the second cylinder 56.

Between each second piston 51 and the respective peg 58 a respective second spring 59 is arranged.

Each second piston 51, able to slide in a sealed manner inside the respective second cylinder 56, is equipped with a respective second lip seal 60.

The counter-roller 47, finally, is rotatably supported idly in a cavity 61 foreseen in the tab 17 of the frame 5.

The roller 46 comprises two side closing discs 62, fixedly connected at the respective ends.

FIG. 15 represents the pneumatic actuation diagram of a possible embodiment of the apparatus according to the invention.

Also with reference to such a scheme of FIG. 15 for better understanding, the operation of the apparatus 1 according to the present invention is, in light of what has been described, the following.

It is presumed that, at the start of the cycle, the band 4 is already in position to be cut, as indeed illustrated in FIG. 15.

The operator, supporting the apparatus 1 through the handgrip 6, chooses a point of the plate 3 at which to apply a spacer element 2.

He then rests the feeler pin 40 on the surface of the plate 3 and then exerts a light pressure, sufficient to overcome the resistance of the first return spring 34 of the first slide 32.

By doing so, the first slide 32 translates and makes compressed air enter into the first cylinder 21 of the first pneumatic actuator 18: the first piston 22 therefore translates and takes the cutting and application member 8 with it. The latter cuts the band 4 and projects the spacer element 2 outwards through the expulsion mouth 13. The spacer element 2 is therefore applied energetically onto the surface of the plate 3, where it stably sticks, and from which it can in any case be removed with a simple gesture.

The operator at this point, when application has occurred, releases the pressure of the feeler pin 40 against the plate 3; by doing so, the first slide 32 goes back into the initial position and places the first cylinder 21 in communication with the discharge orifice 37. The first piston 22, then, goes back into the initial position and presses the second slide 33, making a situation like the one represented in the section of FIG. 6.

Such pressure on the second slide 33 causes it to translate, and thus causes compressed air to pass into the second cylinders 56, precisely as illustrated in FIG. 15.

Due to this, the second pistons 51 translate downwards and force a rotation on the gearwheels 53, thus pulling the band 4 towards the expulsion mouth 13 for a new cycle.

As can be seen, this last "reloading" operation of the band 4 takes place completely automatically upon the release of the feeler pin 40 from the surface of the plate 3.

It should be noted that the pneumatic diagram of FIG. 15 is just one of the many possible ones that allow the described operation to be carried out.

Another embodiment of the apparatus according to the invention foresees, instead of the connection to a compressed air source, the presence of an air cylinder, incorporated for example at the handgrip 6 or at other parts of the apparatus, which allows the latter to operate freely and without any feeding duct, thus being able to be moved, transported, etc.

Yet another embodiment of the apparatus according to the invention foresees the use of electrical instead of pneumatic actuation means.

Indeed, it is possible to use linear actuators actuated by respective electric motors to control the movements of the cutting and application member 8 and the means for feeding the band 7. In order to control said electric motors a simple known sequential electronic control board can be used.

In a further embodiment thereof according to the invention, the apparatus lacks the handgrip 6, and also the store 9. In this way, it can be advantageously installed on automated devices such as automatic machines, robotized arms, and similar, to thus meet the needs of production lines of larger sized batches.

The invention, thus conceived, allows important technical advantages to be obtained.

Indeed, the apparatus according to the invention, thanks to the simple, light and compact structure, can be handled and used easily by operators without special training.

Moreover, the completely automatic operation of the apparatus allows each spacer element to be applied with a simple gesture of lightly pressing the feeler pin on the plate, of various materials for example glass: as stated, such a gesture allows both the application of the spacer element on the plate, and the following "reloading" step for the subsequent application, in an extremely fast time, practically instantaneously.

The apparatus is extremely flexible and versatile to use, since it allows the operator to have the maximum freedom of application of the spacer elements, in terms of number on every plate and of position, without the constraints set by conventional automated machinery. This advantage is particularly noticeable in the case of use for the production of a limited number of pieces, of various sizes and different shapes, like for example oval, trapezoidal, etc.

The use of the apparatus according to the invention is practical and comfortable, in the sense that it allows work even at a fast rate without the operator feeling tired.

Last but not least, the manufacturing cost of the apparatus is extremely low in relation to the performance in use, since it comprises a small number of actuators controlled by a pneumatic valve of the type known on the market, and it also does not need electrical energy or particular maintenance operations.

It has thus been seen how the invention achieves the proposed purposes.

The present invention has been described according to preferred embodiments, but equivalent variants can be devised without departing from the scope of protection offered by the following claims.

The invention claimed is:

1. An apparatus for the application of spacer elements onto plates, wherein it comprises:
    means for feeding spacer elements in the form of a band;
    at least one member for cutting the band and for applying the spacer elements, formed by the cutting, onto a plate, wherein said member for cutting the band and applying the spacer elements is slidably housed inside a respective seat, open at the front, foreseen in the frame of the apparatus and defining an expulsion mouth for the spacer elements,
        wherein said member for cutting the band and applying the spacer elements is associated with the first stem of a first actuator fixed to said frame so as to be mobile from at least one inactive inner position to at least one outer position for transversally cutting the band and for applying the spacer element, formed by the cutting, onto the surface of the plate,
    said member for cutting the band and applying the spacer elements comprises at least one transversal blade at the front, and
    the apparatus further comprises a transversal counter-blade, positioned at one of the edges of said expulsion mouth for the spacer elements, cooperating with said transversal blade of said cutting and application member,
    wherein the first actuator is a first pneumatic actuator or a first electrical actuator.

2. The apparatus according to claim 1, wherein when the first actuator is a first pneumatic actuator, the apparatus comprises pneumatic actuation means.

3. The apparatus according to claim 2, wherein said first pneumatic actuator is of the single-acting linear type and it is operatively slaved to a sequential pneumatic actuation means.

4. The apparatus according to claim 2, wherein said pneumatic actuation means comprise at least one pneumatic slide valve operatively connected to a first pneumatic actuator and to a second pneumatic actuator.

5. The apparatus according to claim 4, wherein said pneumatic valve comprises a first valve body, provided with at least one first slide able to be actuated by a shaft of an actuation element, and a second valve body, equipped with at least one second slide able to be actuated by a first piston of said first pneumatic actuator.

6. The apparatus according to claim 5, comprising a connection orifice to a source of compressed air placed in communication with a union or quick coupling foreseen in a free end of a handgrip.

7. The apparatus according to claim 1, wherein said cutting and application member comprises at least one transversal blade at the front.

8. The apparatus according to claim 7, comprising a transversal counter-blade, positioned at one of the edges of an expulsion mouth of the spacer elements, cooperating with said blade of said cutting and application member.

9. The apparatus according to claim 1, wherein said feeding means comprise a controlled roller and an idle counter-roller supported in the front portion of said apparatus at an expulsion mouth of the spacer elements, said roller and counter-roller being suitable for pulling said band in front of said expulsion mouth between said blade and counter-blade.

10. The apparatus according to claim 9, wherein said roller is associated with rack means controlled by at least one second pneumatic actuator.

11. The apparatus according to claim 10, wherein said rack means comprise a pair of racks respectively integral with pistons of a pair of said second pneumatic actuators of the single-acting type, and two gearwheels, fitted at the respective opposite ends of said roller, which engage with said racks.

12. The apparatus according to claim 10, wherein said second pneumatic actuators are operatively slaved to a sequential pneumatic actuation means.

13. The apparatus according to claim 9, wherein said roller comprises a central portion for pulling said band, associated with said roller through a free wheel mechanism.

14. The apparatus according to claim 1, at least comprising an actuation element of the apparatus for being pressed on the surface of the plate.

15. The apparatus according to claim 14, wherein said actuation element is associated with a sequential pneumatic actuation means.

16. The apparatus according to claim 14, wherein said actuation element comprises a feeler pin, slidably associated with said frame near to an expulsion mouth of the spacer elements, and coupled with a shaft connected to sequential pneumatic actuation means.

17. The apparatus according to claim 1, comprising at least one handgrip.

18. The apparatus according to claim 1, comprising at least one store for said band.

19. The apparatus according to claim 18, wherein said store comprises two half-shells that enclose at least one reel of band, said half-shells being supported by a frame and equipped with an opening for the band to pass through towards a feeding means.

20. An apparatus for the application of spacer elements onto plates, wherein it comprises:
    means for feeding spacer elements in the form of a band;
    at least one member for cutting the band and for applying the spacer elements, formed by the cutting, onto a plate,
        wherein said feeding means comprise a controlled roller and an idle counter-roller supported in the front portion of said apparatus at an expulsion mouth of for the spacer elements, said roller and counter-roller being suitable for pulling said band in front of said expulsion mouth between a blade and a counter-blade, and wherein said roller is associated with rack means controlled by at least one second pneumatic actuator.

21. The apparatus according to claim 20, wherein said rack means comprise a pair of racks respectively integral with pistons of a pair of said pneumatic actuators of the single-acting type, and two gearwheels, fitted at the respective opposite ends of said roller, which engage with said racks.

22. An apparatus for the application of spacer elements onto plates, wherein it comprises:
   means for feeding spacer elements in the form of a band;
   at least one member for cutting the band and for applying the spacer elements, formed by the cutting, onto a plate; and
   an actuation element of the apparatus for being pressed on the surface of the plate,
      wherein said actuation element comprises a feeler pin, slidably associated with said frame near to an expulsion mouth of for the spacer elements, and coupled with a shaft connected to a pneumatic actuator.

23. An apparatus for the application of spacer elements onto plates, wherein it comprises:
   means for feeding spacer elements in the form of a band;
   at least one member for cutting the band and for applying the spacer elements, formed by the cutting, onto a plate; and
   at least one pneumatic slide valve operatively connected to a first pneumatic actuator and to a second pneumatic actuator.

* * * * *